US010690000B1

(12) United States Patent
Alecu et al.

(10) Patent No.: US 10,690,000 B1
(45) Date of Patent: Jun. 23, 2020

(54) GAS TURBINE ENGINE AND METHOD OF OPERATING SAME (71) Applicant: PRATT & WHITNEY CANADA CORP., Longueuil (CA)

(72) Inventors: Daniel Alecu, Brampton (CA); Enzo Macchia, Kleinburg (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/387,773

(22) Filed: Apr. 18, 2019

(51) Int. Cl.
*F01D 15/10* (2006.01)
*F02C 7/32* (2006.01)
*F02C 3/04* (2006.01)
*H02K 7/18* (2006.01)

(52) U.S. Cl.
CPC ............. *F01D 15/10* (2013.01); *F02C 3/04* (2013.01); *F02C 7/32* (2013.01); *H02K 7/1823* (2013.01); *F05D 2220/32* (2013.01); *F05D 2220/764* (2013.01); *F05D 2220/768* (2013.01)

(58) Field of Classification Search
USPC .............................................. 290/52; 416/95
See application file for complete search history.

(56) References Cited

U.S. PATENT DOCUMENTS

| | | | | |
|---|---|---|---|---|
| 2,540,472 A * | 2/1951 | Boyd | .................. | F01D 5/18 219/201 |
| 2,547,934 A | 4/1951 | Gill | | |
| 3,455,396 A * | 7/1969 | Cummings | ............ | B64D 15/12 416/95 |
| 4,486,638 A * | 12/1984 | de Bennetot | ........ | H02K 49/043 219/631 |
| 4,699,568 A * | 10/1987 | Harlamert | .............. | B64D 15/12 416/155 |
| 5,281,091 A * | 1/1994 | Dooley | ................... | F02C 7/047 244/134 D |
| 5,558,495 A * | 9/1996 | Parker | .................. | B64D 41/007 416/95 |
| 5,709,532 A * | 1/1998 | Giamati | ................. | B64D 15/12 219/483 |
| 5,746,580 A * | 5/1998 | Parker | .................. | B64D 41/007 416/245 R |
| 5,769,606 A * | 6/1998 | Mondet | .................. | B64D 15/12 244/134 D |
| 6,216,979 B1 * | 4/2001 | Faure | ..................... | B64D 15/12 244/17.11 |
| 6,503,056 B2 * | 1/2003 | Eccles | .................. | B64D 41/007 416/142 |
| 7,258,526 B2 * | 8/2007 | Dooley | ..................... | F01D 5/34 415/177 |
| 7,323,667 B2 * | 1/2008 | Dooley | ................. | F04D 29/584 219/630 |
| 8,573,932 B2 | 11/2013 | Ross et al. | | |

(Continued)

*Primary Examiner* — Pedro J Cuevas
(74) *Attorney, Agent, or Firm* — Alexandre Daoust; Norton Rose Fulbright Canada LLP (57) ABSTRACT

The gas turbine engine can have a rotor rotatably mounted to an engine casing, the rotor having compressor blades, and an alternator, the alternator having an armature with a winding forming part of the rotor and a magnetic field generator forming part of the engine casing, with an air gap between the magnetic field generator and the armature, the winding being electrically connected to a resistor embedded in at least one of the compressor blades.

20 Claims, 8 Drawing Sheets

(56) References Cited

U.S. PATENT DOCUMENTS

| | | | | |
|---|---|---|---|---|
| 9,133,714 B2* | 9/2015 | Vontell | ............... | F01D 5/147 |
| 9,359,898 B2* | 6/2016 | Miller | ............... | F01D 5/08 |
| 9,642,190 B2* | 5/2017 | Jarvinen | ............... | F01D 5/08 |
| 9,708,929 B2* | 7/2017 | Szwedowicz | ............... | F02C 7/047 |
| 2014/0199170 A1* | 7/2014 | Madsen | ............... | B23P 15/04 |
| | | | | 416/95 |
| 2014/0366552 A1* | 12/2014 | Szwedowicz | ............... | F02C 7/047 |
| | | | | 60/779 |
| 2015/0377129 A1* | 12/2015 | Ward | ............... | F01D 15/10 |
| | | | | 60/39.093 |
| 2016/0138419 A1* | 5/2016 | Kray | ............... | F01D 5/282 |
| | | | | 415/208.1 |
| 2016/0353523 A1* | 12/2016 | Jarvinen | ............... | F01D 5/08 |
| 2018/0209338 A1* | 7/2018 | Alecu | ............... | F02C 6/12 |

* cited by examiner

GAS TURBINE ENGINE AND METHOD OF OPERATING SAME

TECHNICAL FIELD

The application related generally to gas turbine engines and, more particularly, to a heater therefor.

BACKGROUND OF THE ART

Certain combinations of atmospheric conditions can lead to the accumulation of ice on aircraft engine components. While aircraft gas turbine engines are typically designed in a manner to limit the impact of this phenomena, there remains room for improvement.

SUMMARY

In one aspect, there is provided a gas turbine engine comprising in serial flow communication a compressor section, a combustor, a turbine section, a rotor rotatably mounted to an engine casing, the rotor having compressor blades, and an alternator, the alternator having an armature with a winding forming part of the rotor and a magnetic field generator forming part of the engine casing, with an air gap between the magnetic field generator and the armature, the winding being electrically connected to a resistor embedded in at least one of the compressor blades.

In another aspect, there is provided a heater comprising an armature having a winding forming part of a rotor and a magnetic field generator forming part of a stator, the winding being electrically connected to a resistor embedded in a blade of the rotor.

In a further aspect, there is provided a method of operating a gas turbine engine comprising in serial flow communication a compressor section, a combustor, a turbine section, a rotor rotatably mounted to an engine casing, the rotor having compressor blades, a winding forming part of the rotor and electrically connected to a resistor embedded in at least one of the compressor blades, the method comprising: rotating the rotor including the winding in a manner to successively close magnetic circuits of alternating orientations with a sequence of circumferentially distributed and alternating-orientation magnetic poles, the poles fixed relative to the engine casing, and thereby generating an alternating electrical current in the resistor dissipating, in turn, heat in the compressor blade.

DESCRIPTION OF THE DRAWINGS

Reference is now made to the accompanying figures in which.

DETAILED DESCRIPTION

Figure 1:
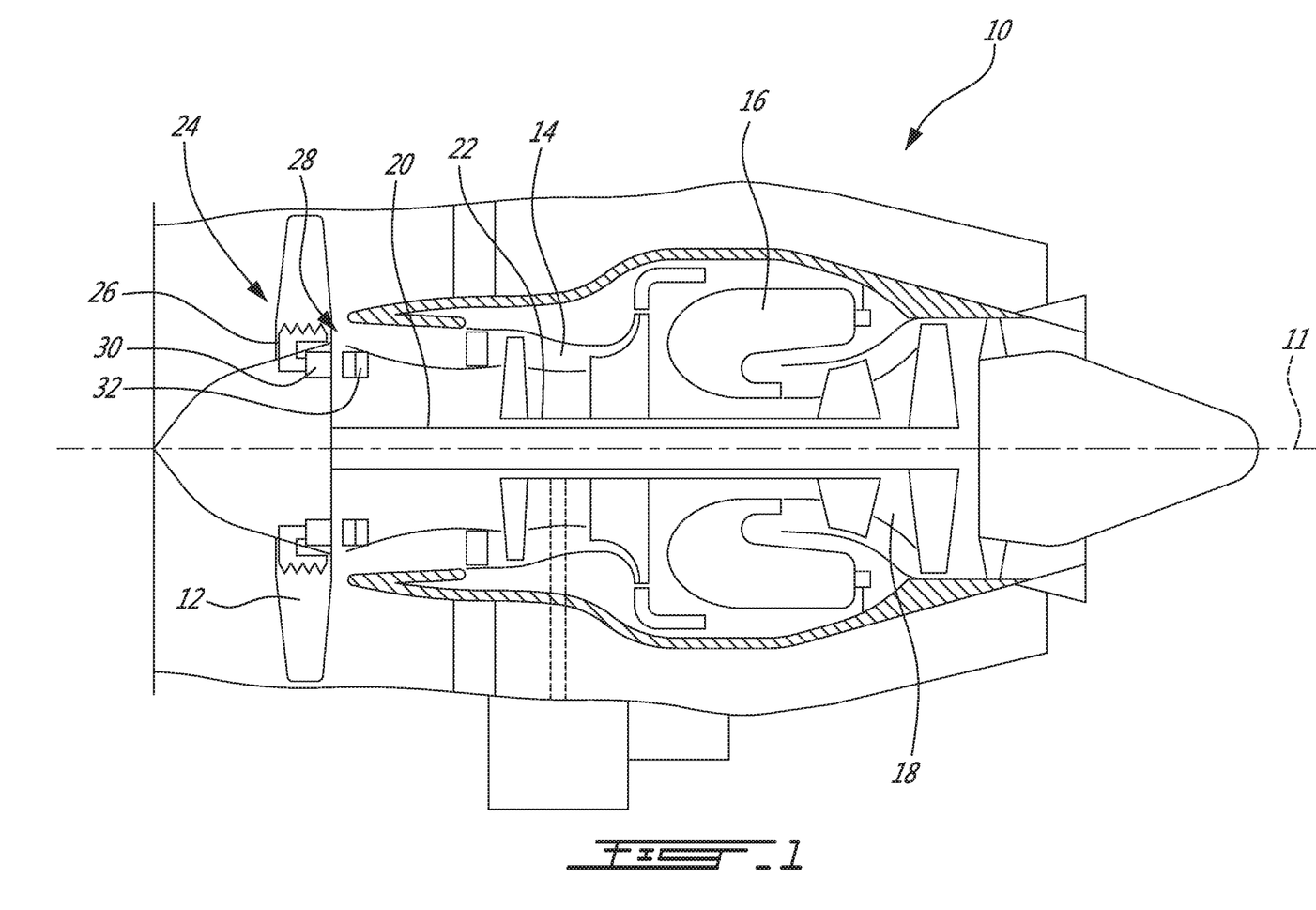
FIG. 1 is a schematic cross-sectional view of a gas turbine engine.

FIG. 1 illustrated a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The gas turbine engine can include one or more rotors 20, 22 which each can have blades of one or more compressors, such as fan blades, low pressure compressor blades or high pressure compressor blades. In this embodiment, the gas turbine engine 10 includes a low pressure rotor 20 including fan blades and second turbine stage blades assembled to a low pressure shaft, and a high pressure rotor 22 including compressor blades and first turbine stage blades assembled to a high pressure shaft, but other embodiments can have a different amount of rotors. The rotors 20, 22 are mounted to non-rotating engine components (e.g. engine casing) via bearings and rotate around a common engine axis 11.

In this example, the gas turbine engine 10 has a heater 24. The heater 24 includes a resistor 24 and an electric machine. In this example, the electric machine includes an alternator, and more specifically an armature 30 which is assembled to form part of the rotor, and a magnetic field generator 32 which is assembled to form part of the non-rotating engine components, such as the engine casing, which can also be referred to here as a stator.

The basic principle of operation of the alternator, in this example, is explained with reference to FIGS. 2A to 2C. The magnetic field generator 32 can include a plurality of regularly interspaced, alternating magnetic poles 34, 36, 38. The magnets forming the alternating magnetic poles 34, 36, 38 can be permanent magnets or electro-magnets, for instance. The armature 30 is configured to close a magnetic circuit between two adjacent, opposite, magnetic poles such as poles 34 and 36 or poles 36 and 38.

Figure 3:
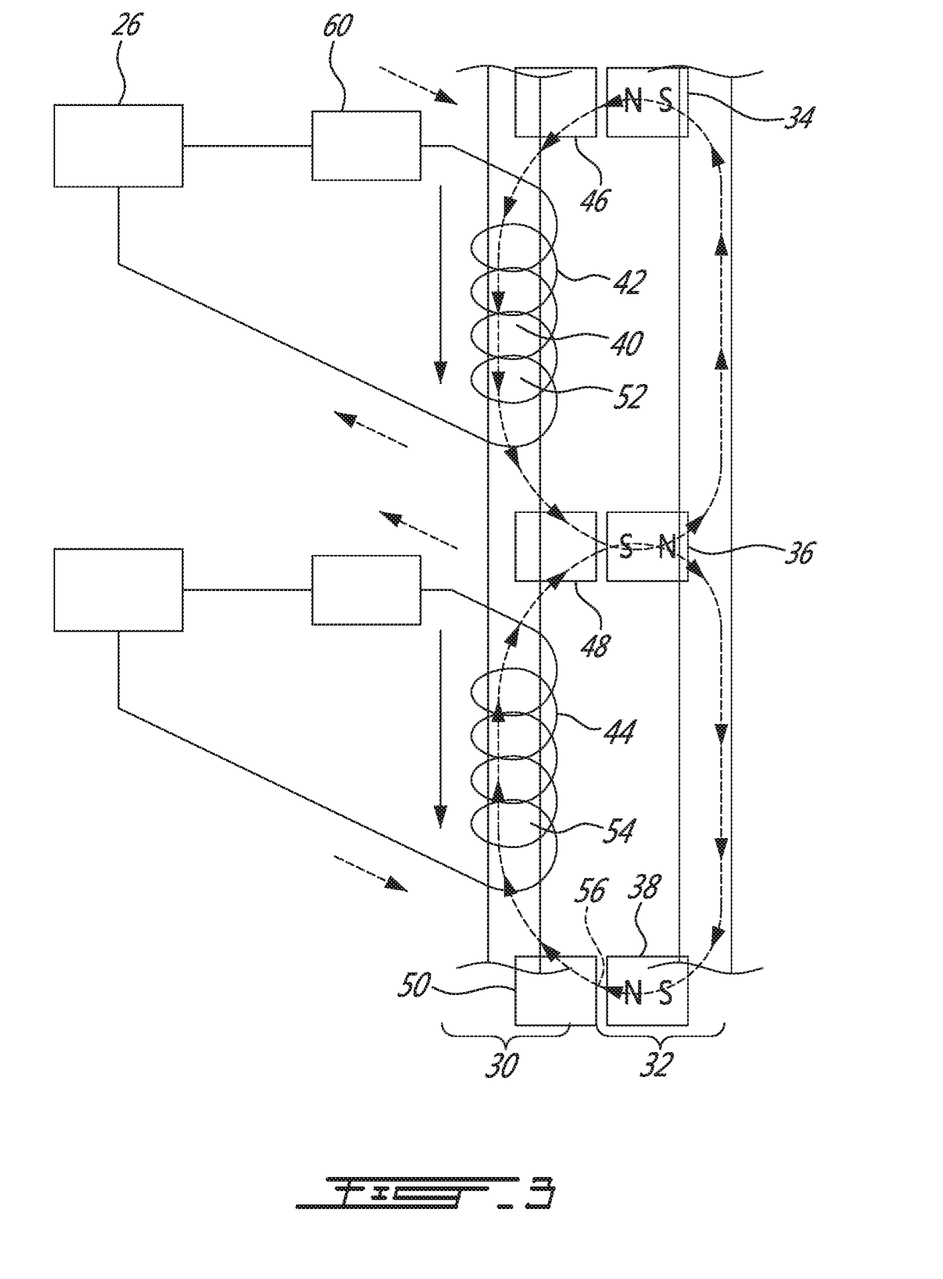
FIG. 3 is a schematic view of a heater of the gas turbine engine of FIG. 1.
Figure 4A:
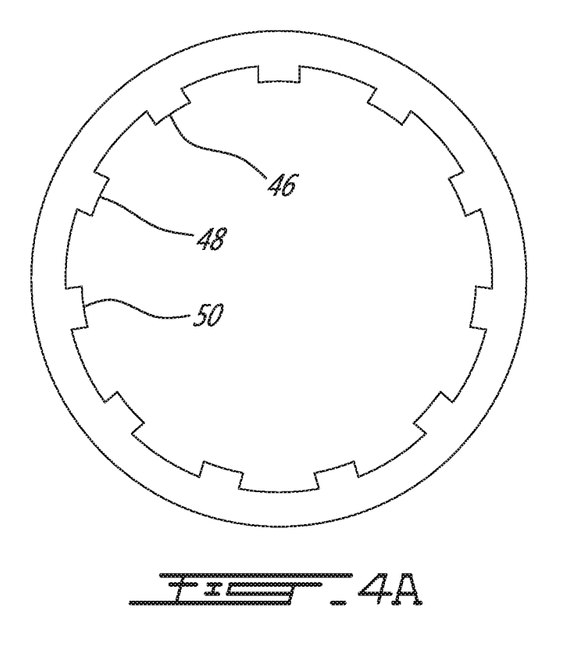
FIG. 4A is a transversal cross-section view of a ferromagnetic core.
Figure 4B:
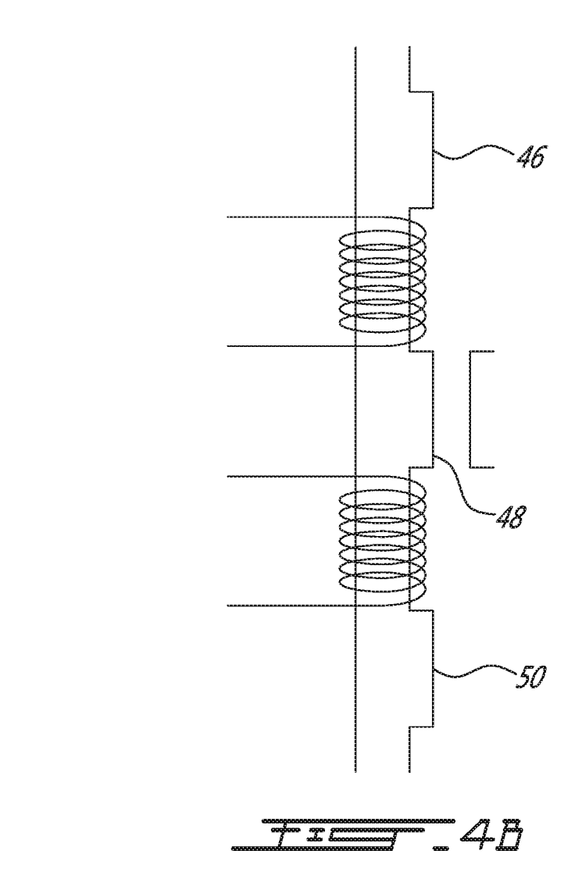
FIG. 4B is a side elevation view of an armature having a ferromagnetic core with windings.

In this example, the armature has a "soft" ferromagnetic core 40 to achieve this purpose. A ferromagnetic material responds quickly to a magnetic field by becoming magnetic itself, and a soft ferromagnetic material can, specifically, rapidly change the orientation of its magnetic field. Modern "iron glasses", for instance, can reach relative inductivity of 200,000. A winding 42 is coiled around the soft ferromagnetic core 40. In practice, a plurality of circumferentially interspaced windings 42, 44 can be provided around corresponding magnetic domains, and each winding can be electrically connected to a corresponding resistor 26. The resistors 26 can be embedded in corresponding blades, or other portions of the rotor. The windings 42, 44 can operate independently from one another, or by groups, and the operation of a single winding will be explained as an example of how all windings can operate. In practice, as shown in FIGS. 3, 4A and 4B, the ferromagnetic core 40 can include narrower portions 52, 54 extending between crenels 46, 48, 50 (or poles), in a manner to allow room for the winding 40, 44 while minimizing an air gap 56 between the crenels 46, 48, 50 and the magnets 34, 36, 38. The amount of alternating direction magnetic field domains can be equal to the number of crenels around the ring.

Figure 2A:
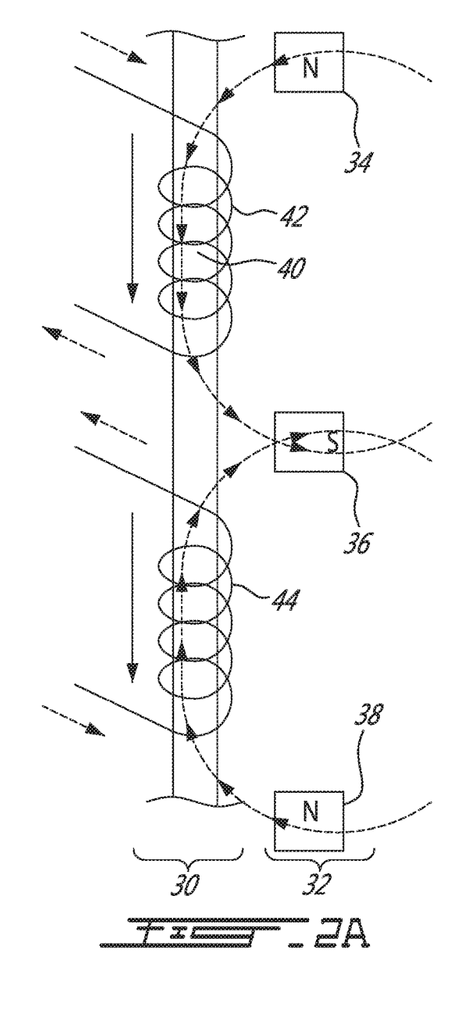
FIGS. 2A, 2B and 2C are a sequence of side views showing an armature moving relative to a magnetic field generator.
Figure 2B:
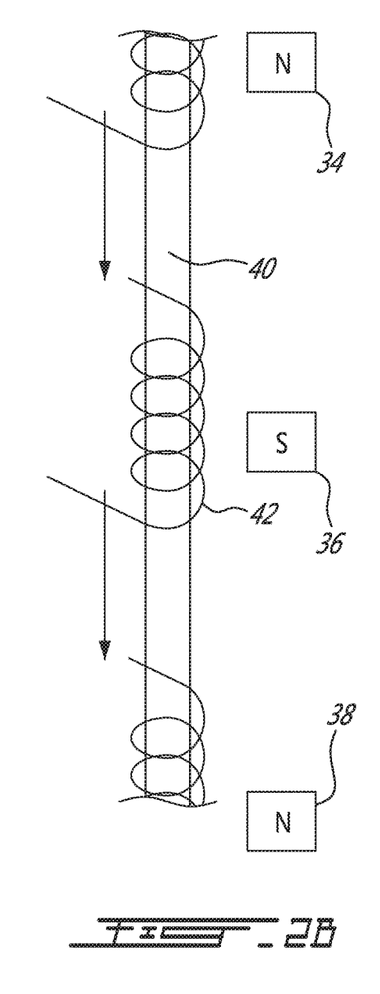
Figure 2C:
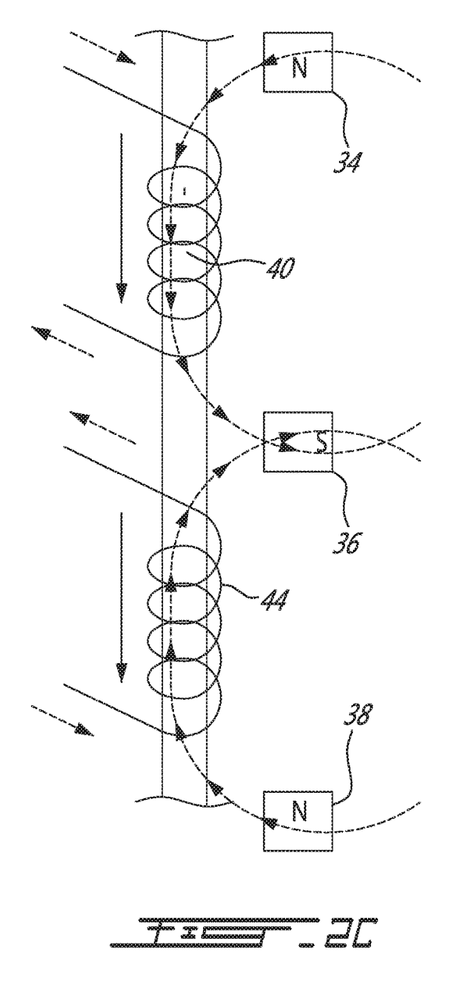

As the armature 40 is rotated as part of the rotor, the winding 42 and the portion of the soft ferromagnetic material (magnetic domain) associated to it eventually becomes aligned precisely between two opposite magnet poles 34, 36—see FIG. 2A. At this point, its internal magnetic field is the strongest. Subsequently, as illustrated in FIG. 2B, it moves out from the alignment and can then become perfectly disaligned, at which point its magnetic field is at its lowest strength. Subsequently, as illustrated in FIG. 2C, it comes into alignment with a subsequent pair of opposite magnet poles 36, 38, at this point, the magnetic field is at its strongest again, but since the configuration of the magnet poles 36, 38 is inversed compared to the initial configuration 34, 36, the internal magnetic field is inversed as well. As the rotor continues to rotate, the armature 40 continues to generate inversing magnetic field orientations. The winding 42, exposed to these inversing magnetic field orientations, exhibits an alternating electrical current which, via electrical connection, powers the resistor 26, where the electrical power is converted to heat.

In practice, the armature can be provided with crenels 46, 48, 50, such as shown in FIGS. 3, 4A and 4B, which can be precisely dimensioned in a manner to minimize an air gap 56 between the armature 40 and the stator magnet poles 34, 36, 38, and favour a strong magnetic flux in the ferromagnetic material. Indeed, the ferromagnetic core 40 is typically thinner between the crenels 46, 48, 50 to allow space for the thickness of the winding 42, 44.

As shown in FIG. 3, an electrical circuit can be formed including one winding 42 for each resistor 26. Corresponding resistors can be integrated to corresponding blades. Alternately, each winding 42, 44 can be configured to power more than one resistor, such as resistors on a number of adjacent blades, for instance, or conversely, windings can be connected to one another to power a single resistor while respecting polarity. Moreover, the electrical circuit can include one or more switch 60, allowing to selectively close the circuit specifically in circumstances which are known as being prone to icing. Various types of switches can be used alone or in combination, depending on the particulars of the specific embodiment. A centrifugal contact switch can be used to close the electrical contact upon reaching a given RPM, for instance, or open the electrical contact above a given RPM. A thermal cutoff can be used to open the electrical contact if the blade temperature exceeds a given threshold, for instance. A photo-sensitive switch can be used in conjunction with a light emitter integrated to the stator. Indeed, the photo-sensitive switch can be configured to react to light emitted by the light emitter, and the light emitter can be controlled wiredly, for instance, such as to open or close a circuit via the photo-sensitive switch. The light emitter can be a LED, a laser, or any other suitable light emitter. Alternately, if the stator magnets are electro-magnets, commonly referred to as field coils, the heater can be deactivated by depowering the electro-magnets. The powering or depowering via active control means, such as electro-magnet control or a light emitter for instance, can be performed based on an indication of icing. Indeed, aircraft are typically provided with sensors and software which can determine whether icing is (or may be) occurring or not. Accordingly, active control means can be operated to cause heating contingent upon the reception of a signal indicative that icing is occurring, or has occurred.

Figure 5A:
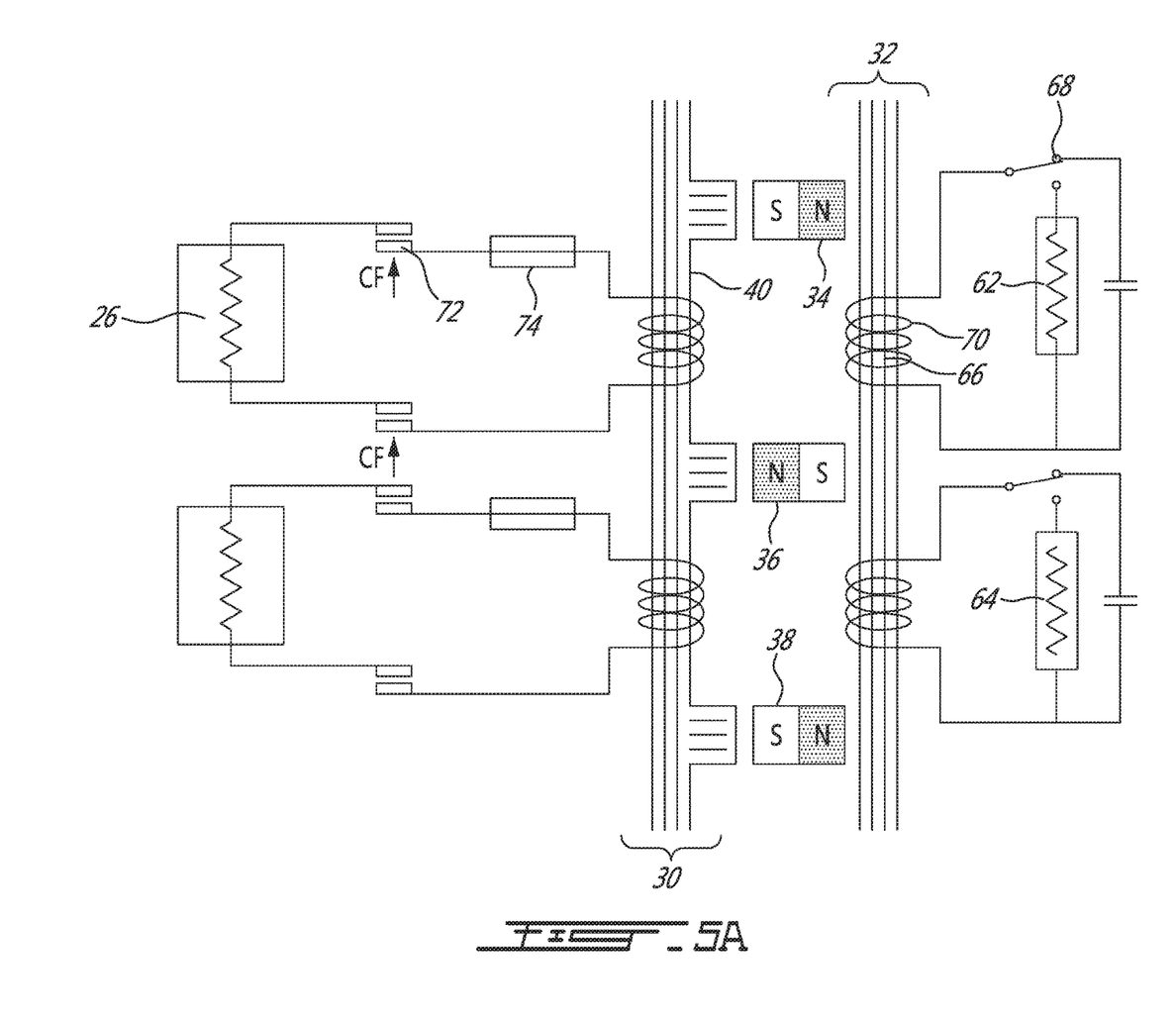
FIG. 5A is an example electrical circuit of a heater.

Turning to FIG. 5A, while relatively simple embodiments were discussed and explained above, it will be understood that more evolved embodiments are also possible. In the circuit illustrated in FIG. 5A, for instance, not only does the heater include resistors 26 on the rotor side, but the heater further includes resistors 62, 64 on the stator side. Indeed, the stator is also provided with a soft ferromagnetic core 66, and the electric machine is configured to generate an varying magnetic field in the stator core as well. Moreover, the stator-side electrical circuit includes a capacitor C in addition to a resistor 62, 64, and a switch 68 which can be wiredly operated to selectively connect either the resistor 62, or the capacitor C, to the corresponding stator winding 70. The stator resistors 62, 64 can be embedded into components which are prone to icing, such as compressor vanes for instance. The stator circuit can also be provided with a switch to allow selectively closing or opening the circuit.

The stator circuitry can create a variable reactive power exchanged between the stator and the rotor which can effectively shift the phase of the stator magnetic field relative to the rotor magnetic field. The stator magnetic field has a constant component due to the magnets but also a large alternative component due to the stator coils induced alternative current. This can either be used with the intention of controlling the rotor heating, in which case the stator heating is simply a side-effect, but in some embodiments, the stator heating can be desirable as well.

In a nutshell, the moving of the rotor can modulate the stationary magnet field. The variable field can generate AC currents both in the rotor circuit and the stator circuit (when closed). The currents heat the imbedded heating elements. When the stator circuit is open, the current in the stator drops to zero, which can also significantly reduce the current in the rotor circuit. Also, the stator circuit can be closed through a capacitor. The reactive power in the LC circuit (stator winding L and the capacitor C) tends to produce a magnetic field opposing the fluctuation created by the rotor passage, which can further reduce the current in the rotor circuit.

An analysis conducted suggests that in an example gas turbine engine, each blade may need 25 square inches of heated surface on the pressure side only (the pressure side is more prone to icing than the suction side, and if a limited heating surface is available, it can be preferred to strategically cover the areas which are considered the most prone to icing). In such an embodiment, at −10° C., it can require ~9 W/sq in*25 sq in, and therefore 225 W per blade. At −20 C it would require ~20 W/sq in*25 sq in, and therefore 500 W per blade. In some embodiments, it can be preferred to provide even higher heating capacity such as by coupling circuits or changing of resistance elements. Typical open electric machinery, i.e. no casing and no bearings (externally supported) may provide ~1000 W/lb. 22 blades times 500 W yields 11000 W. That is 11 lb to be distributed between the rotor and the stator, which can be a reasonable tradeoff in some embodiments.

The system can incorporate fail safe features, and can be made to operate without an external power source (e.g. via the use of permanent magnets). Failing of one stator circuit doesn't affect significantly the system performance since the rest of the circuits can still provide the required filed. The failure of one switch in closed position may moderately increase the power delivery by 1/N stator circuits fraction, which will be easily dissipate in the rotor. In one embodiment, the heating could remain ON even in the hottest day, with a possible case 0.5% SFC increase (due to the core inlet air heating).

Alternately, the stator can have electro-magnets supplied from an external power source with AC or DC current. This is an alternative for a magnet-less machinery. This may be a trade-off between the magnets cost, weight, and the intrinsic autonomy of permanent magnet machinery.

In alternate embodiments, the concept can be refined in the sense that a reduced number of blades can be heated at a time for brief periods of time. This can be achieved by using multiple stator circuits, for instance.

Figure 5B:
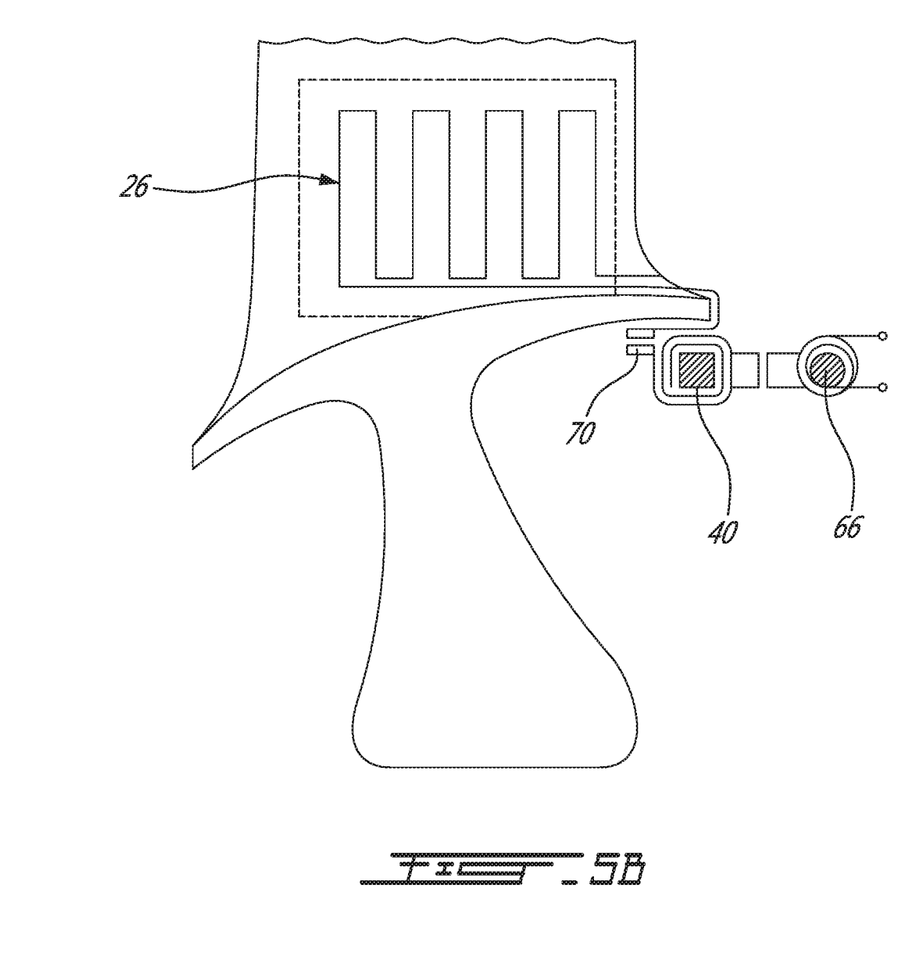
FIG. 5B is a fragmented cross-sectional view of a portion of a gas turbine engine having the heater of FIG. 5A.
Figure 6:
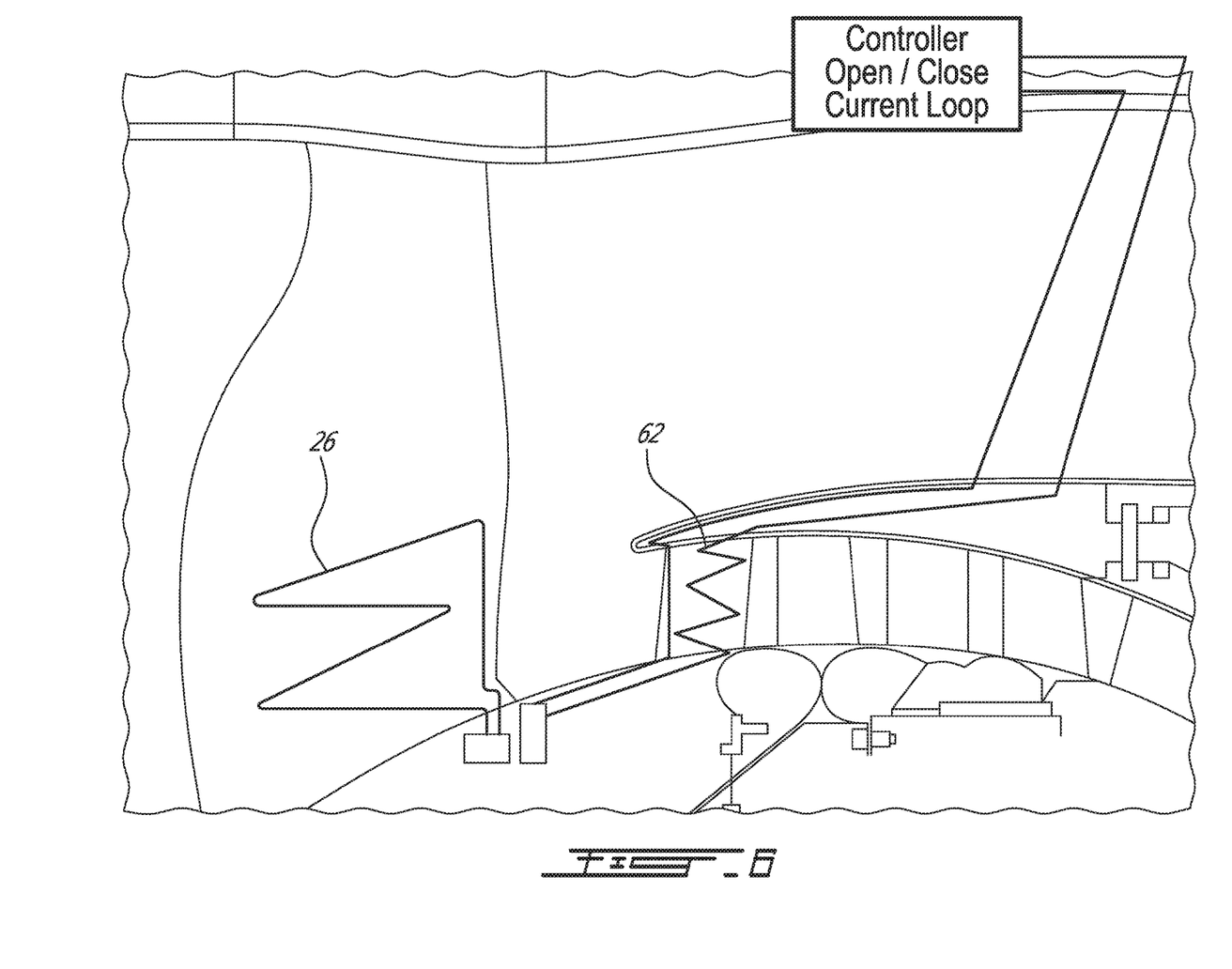
FIG. 6 is an example implementation of a heater in a gas turbine engine.

An example physical implementation of the circuit of FIG. 5A is illustrated in FIG. 5B, which also provides more detail about a possible centrifugal contact 72 configuration. It will be noted that the circuit of FIG. 5A also uses a thermal cutoff 74. FIG. 6 schematizes a possible implementation of a circuit such as shown in FIG. 5A, with the rotor heater 26 embedded in the fan blades, and more specifically on a radially-inner portion of the pressure face of the fan blades, whereas the stator heater 62 is embedded in compressor vanes.

Figure 7:
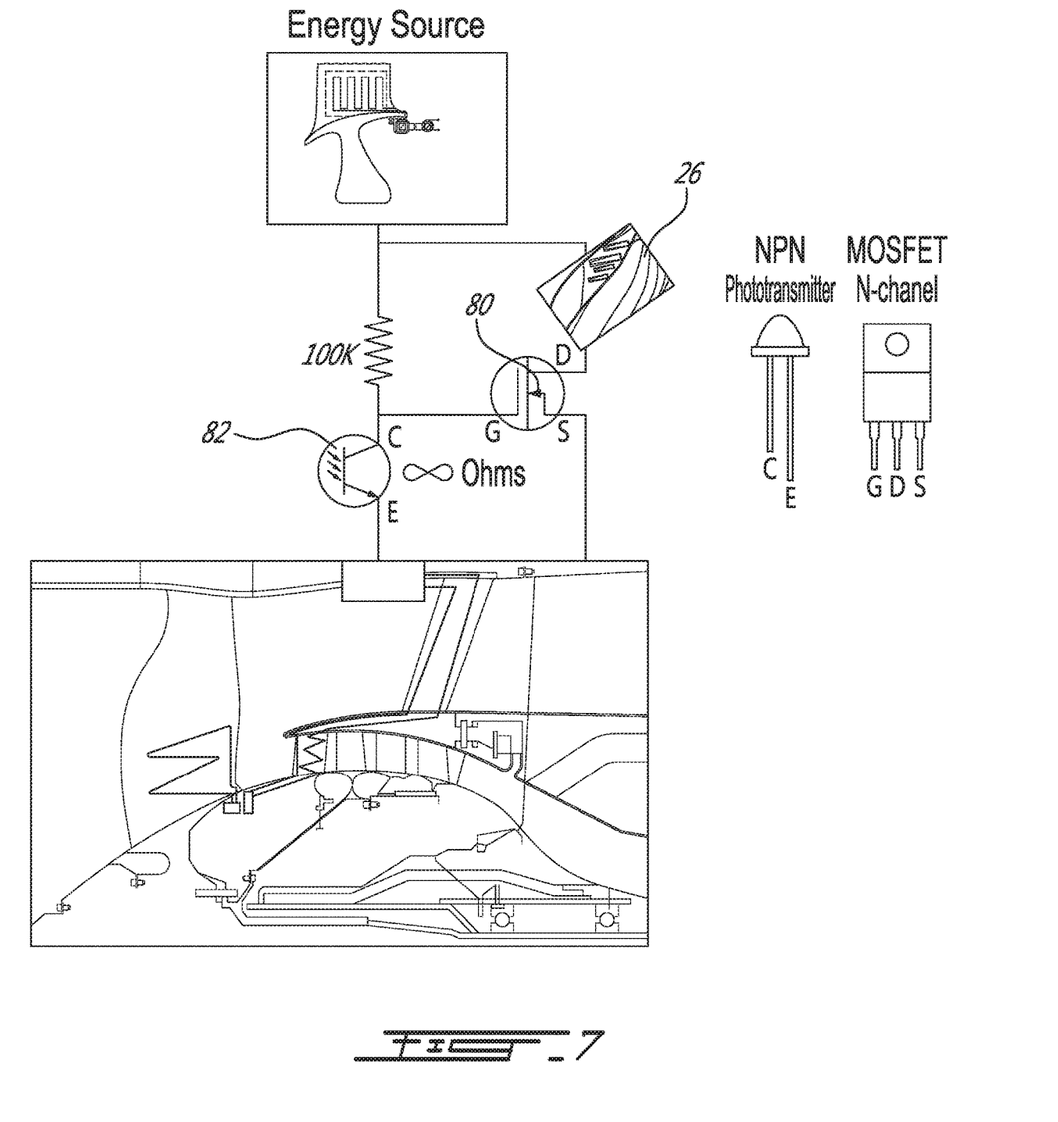
FIG. 7 is a schematic showing an example of active electromagnetic wave control system for a heater.

FIG. 7 provides yet another example of a possible energy management circuit. More specifically, a photon emitter 80 (light, radio waves, or microwaves for instance) is provided on the stator side, and directed to a receptive switch 82 provided on the rotor side. The photon emitter 80 is adapted to turn the circuit on and off, and can be located at the leading edge of the stationary stator for instance, integrated with the magnets or beside them, and controlled by a controller box as indicated. The switch can be hardwired or light activated, and the light location can be strategically placed.

In one embodiment, powering or de-powering of the heating functionality can be controlled by a computer, via a computer program product stored in non-transitory storage media. Based on the program, the computer can trigger switches, or other components, which can activate or deactivate the heating. The program can be designed in order to allow for an input indicative of icing conditions, and the activation of heating can be contingent upon, among potentially other factors, the input indicative of icing conditions. The duration of the heating, and potentially the intensity of heating, can also be controlled, among potentially other variables, by an input indicative of icing conditions.

It will be understood that the expression "computer" as used herein is not to be interpreted in a limiting manner. It is rather used in a broad sense to generally refer to the combination of some form of one or more processing units and some form of non-transitory memory system accessible by the processing unit(s). The use of the expression "computer" in its singular form as used herein includes within its scope the combination of a two or more computers working collaboratively to perform a given function. Moreover, the expression "computer" as used herein includes within its scope the use of partial capacities of a processing unit of an elaborate computing system also adapted to perform other functions. Similarly, the expression "controller" as used herein is not to be interpreted in a limiting manner but rather in a general sense of a device, or of a system having more than one device, performing the function(s) of controlling one or more device, such as a valve or pump for instance.

It will be understood that the various functions of a computer or of a controller can be performed by hardware or by a combination of both hardware and software. For example, hardware can include logic gates included as part of a silicon chip of the processor. Software can be in the form of data such as computer-readable instructions stored in the memory system. With respect to a computer, a controller, a processing unit, or a processor chip, the expression "configured to" relates to the presence of hardware or a combination of hardware and software which is operable to perform the associated functions.

In an embodiment, a heating control logic can be employed while utilising an engine data acquisition system, for instance. In one embodiment, the computer can be the engine's control system, for instance.

In the example presented above, the heater is applied to fan blades, rotating components which are known to be prone to ice accumulation in some gas turbine engines. It will be understood that in alternate embodiments, the heater can be applied to other compressor blades than fan blades, such as low pressure compressor blades, and can also be applied to other rotor components than blades which may also be prone to icing, such as a nose cone or hub, for instance.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A gas turbine engine comprising a rotor and an alternator, the rotor rotatably mounted to an engine casing, the rotor having compressor blades, the alternator having an armature with a winding integral with the rotor and a magnetic field generator integral with the engine casing, an air gap disposed between the magnetic field generator and the armature, the winding electrically connected to a resistor embedded in at least one of the compressor blades.

2. The gas turbine engine of claim 1 wherein the magnetic field generator has a plurality of permanent magnets circumferentially interspaced from one another.

3. The gas turbine engine of claim 1 wherein the magnetic field generator has a plurality of field coils circumferentially interspaced from one another, the field coils being connected to an electrical power source.

4. The gas turbine engine of claim 3 wherein the field coils are selectively activatable and de-activatable.

5. The gas turbine engine of claim 1 further comprising a switch in the electrical connection between the winding and the resistor.

6. The gas turbine engine of claim 5 wherein the switch is a centrifugal contact.

7. The gas turbine engine of claim 5 wherein the switch is a thermal cutoff.

8. The gas turbine engine of claim 5 wherein the switch is a photo-sensitive switch, wherein the gas turbine engine has a light emitter integrated to the engine casing, the light emitter operable to emit a light signal which can be received by and trigger the photo-sensitive switch.

9. The gas turbine engine of claim 1 wherein the magnetic field generator includes a plurality of magnets circumferentially interspaced from one another, each magnet has a north-south orientation opposite to a north-south orientation of adjacent magnets around the circumference.

10. The gas turbine engine of claim 9 wherein the armature includes a soft ferromagnetic core, configured to close a magnetic circuit when in circumferential alignment with two adjacent magnets of the magnetic field generator, the winding being wrapped around the soft ferromagnetic core.

11. The gas turbine engine of claim 9 wherein the armature includes a plurality of circumferentially interspaced windings, each winding being connected to a corresponding resistor, the resistors being embedded in corresponding ones of the rotor blades.

12. The gas turbine engine of claim 1 wherein the gas turbine engine further comprises a stator winding forming part of the engine casing and configured to generate an alternating current based on variations in magnetic field orientation, the stator winding being electrically connected to a stator resistor embedded in a stator vane of the gas turbine engine.

13. The gas turbine engine of claim 12 further comprising a capacitor in parallel with the stator resistor, and a switch configured for selectively connecting the capacitor or the stator resistor to the stator winding.

14. The gas turbine engine of claim 12 wherein the stator winding and the rotor winding form part of a doubly fed electric machine.

15. A method of operating a gas turbine engine comprising in serial flow communication a compressor section, a combustor, a turbine section, a rotor rotatably mounted to an engine casing, the rotor having compressor blades, a winding forming part of the rotor and electrically connected to a resistor, the method comprising: rotating the rotor including the winding in a manner to successively close magnetic circuits of alternating orientations with a sequence of circumferentially distributed and alternating-orientation magnetic poles, the poles fixed relative to the engine casing, and thereby generating an alternating electrical current in the resistor.

16. The method of claim 15 further comprising opening an electrical connection between the resistor and winding upon reaching a given threshold temperature.

17. The method of claim 15 further comprising closing an electrical connection between the resistor and winding upon the rotor reaching a given threshold RPM and associated centrifugal deformation.

18. The method of claim 15 further comprising generating the magnetic field of the magnetic poles contingent upon receiving an indication that ice has accumulated or may be accumulating on the compressor blades.

19. The method of claim 15 further comprising closing an electrical connection between the resistor and winding contingent upon receiving an indication that ice has accumulated or may be accumulating on the compressor blades.

20. A heater comprising an armature having a winding forming part of a rotor and a magnetic field generator forming part of a stator, the winding being electrically connected to a resistor embedded in the rotor.

* * * * *